H. L. IDE.
PHOTOGRAPHIC CAMERA.
APPLICATION FILED JAN. 31, 1916.
1,234,339.
Patented July 24, 1917.
2 SHEETS—SHEET 1.
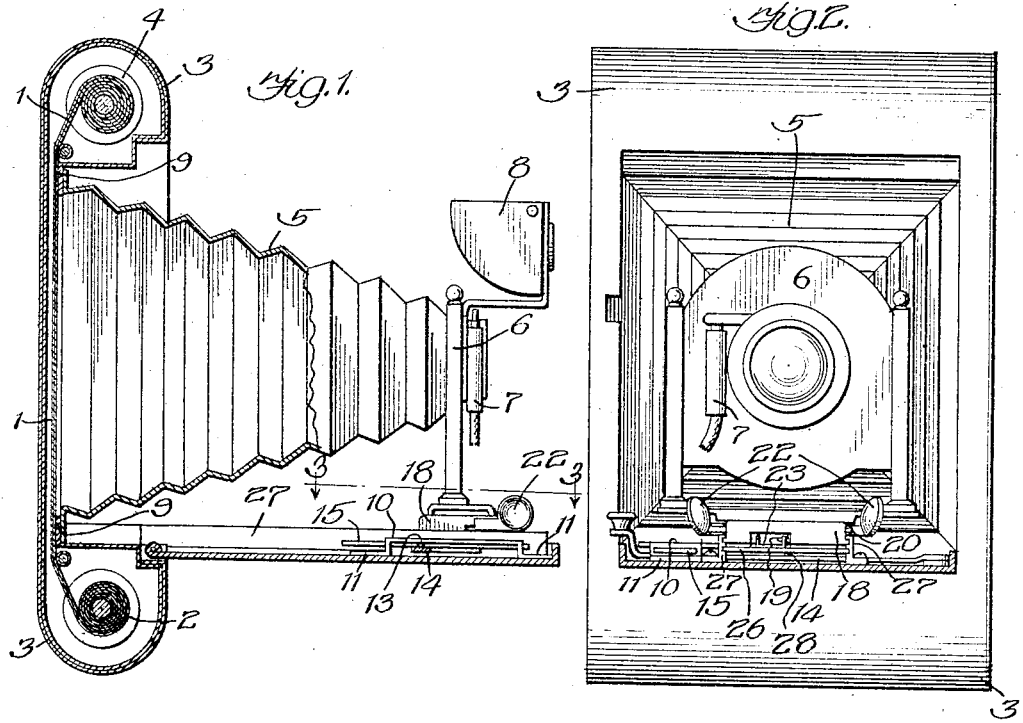
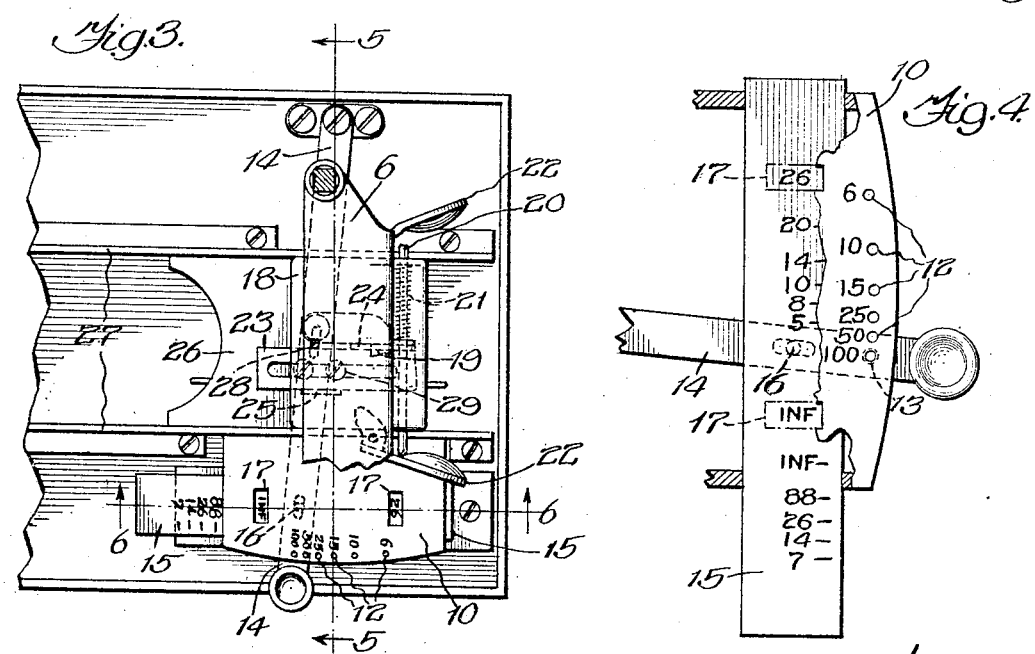
Inventor:
Harry L. Ide.
By G. L. Gregg
Atty.

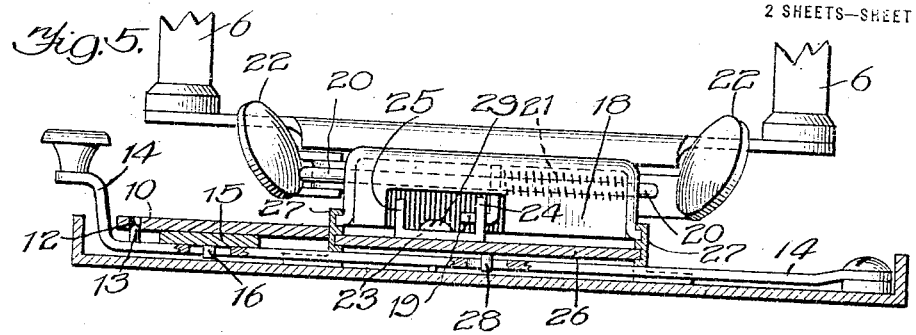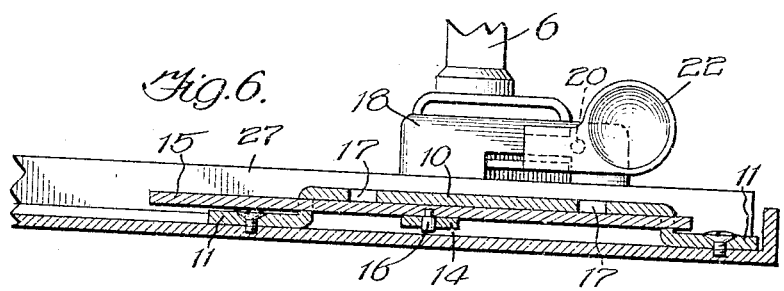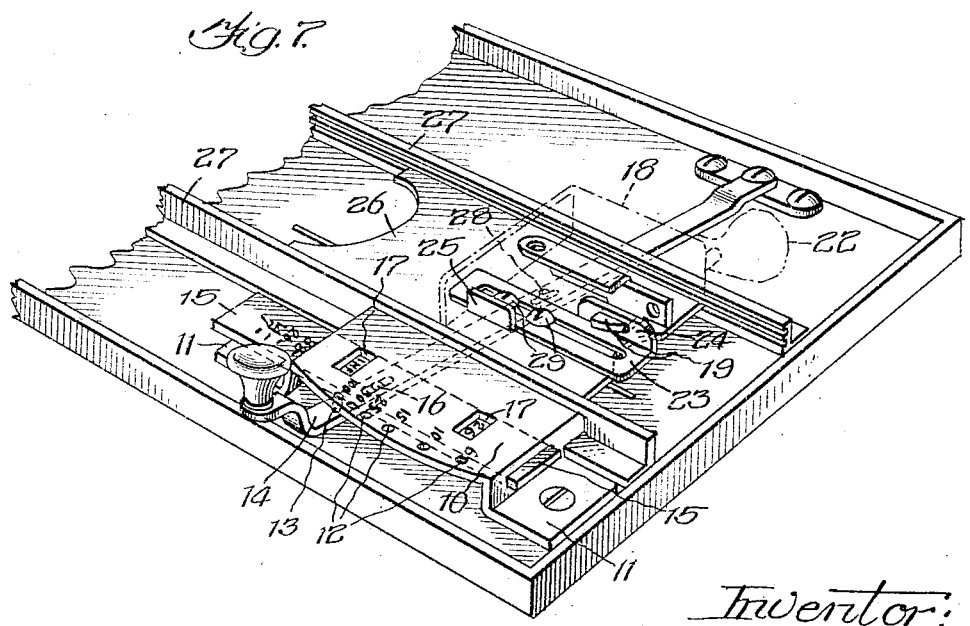

UNITED STATES PATENT OFFICE.

HARRY L. IDE, OF SPRINGFIELD, ILLINOIS, ASSIGNOR OF ONE-HALF TO ROY W. IDE, OF SPRINGFIELD, ILLINOIS.

PHOTOGRAPHIC CAMERA.

1,234,339.  Specification of Letters Patent.  Patented July 24, 1917.

Application filed January 31, 1916. Serial No. 75,218.

*To all whom it may concern:*

Be it known that I, HARRY L. IDE, citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to photographic cameras and has for its object the provision of means for distinguishing or differentiating from other predetermined or arbitrary limits of depths of field the two limits of any depth of field corresponding to the focal distance to which the camera is adjusted. The means which I prefer to employ for effecting such differentiation resides in a cover, desirably non-transparent, that will overlie the designations of the limits of all confusing depths of field excepting those which correspond to the focal distance to which the camera is adjusted. This cover is preferably operatively connected with the mechanism which is employed in adjusting the camera to selected focal distances whereby the result sought is automatically secured.

I will explain my invention more fully by reference to the accompanying drawings showing the preferred embodiment thereof as embraced in a camera of the bellows-roll film type, but to which embodiment the invention is not to be limited. In the drawings Figure 1 is a view in elevation, partially in section, of one style of camera equipped in accordance with the invention; Fig. 2 is an elevation illustrating parts of the camera shown in Fig. 1; Fig. 3 is a sectional plan view of a part of the structure on line 3 3 of Fig. 1; Fig. 4 is a plan view, partially in section, of a portion of the structure shown in Fig. 3, parts being broken away; Fig. 5 is a view on line 5 5 of Fig. 3; Fig. 6 is a view on line 6 6 of Fig. 3; and Fig. 7 is a perspective view showing novel parts of the structure.

Like parts are indicated by similar characters of reference throughout the different figures.

In the camera illustrated the sensitized elements that are to form the photographic negatives are embodied in a flexible element 1 commonly called a ribbon of film which is supplied to the user on a supply spool 2 that is removably inserted in the lower end of a camera casing 3 and from which supply spool the film is led to the winding or receiving spool 4. In the form of camera selected for the purpose of illustrating the invention there is included a bellowslike element 5 which tapers to its forward end at which it is connected with the camera "front" or lens carrier that is provided with the usual lens (of which the frame 6 is shown), the shutter, of which an actuating dash pot 7 is shown, and finder 8, all as is well understood by those familiar with the art. The rear of the bellowslike element 5, as is well known, is attached to the border portion 9 of the casing 3 and defines, with the border portion 9, the extent of the area of the film which is to be exposed to the light in photographic operation.

A scale plate 10 is offset at its ends where it is secured to a portion of the camera as indicated at 11. This scale plate bears several numerical designations, namely, 6, 10, 15, 25, 50, and 100, which denote, in feet, the focal distances to which the camera may or should be adjusted. Each of these numerical designations is placed alongside of an aperture 12, these apertures being capable of receiving a pin 13 carried at the outer end of a long lever 14 (constituting an index) desirably pivotally mounted upon the same camera portion that carries the scale plate 10. This lever is a spring lever with a tension that presses its outer end upwardly so that when the pin 13 registers with any opening 12 (these openings being arranged upon an arc of a circle whose center coincides with the pivotal center of the lever) it will enter such opening when the outer end of the lever is released. A scale plate 15 is in sliding relation with the scale plate 10, the scale plate 15 being desirably the one that is reciprocated, this scale plate 15 having pin and slot connection 16 with the lever 14. Numerical designations are provided upon scale plate or movable member 15 which denominate, in feet, the predetermined or arbitrarily selected limits of the depths of field to which depths the numerical designations of the focal distances appearing upon the scale plate are individual. In detail, the limits of the depth of field which is individual to the focal distance of one hundred feet are twenty-six feet and infinity; such limits corresponding to a focal distance of fifty feet are twenty feet and infinity; such limits corresponding to a focal distance of twenty-five feet are fourteen feet and eighty-eight feet; such limits corresponding to a focal distance of fifteen feet are ten feet and twenty-six feet; such limits corresponding to a focal distance of ten feet are eight feet and fourteen feet; and such limits corresponding to a focal distance of six feet are five feet and seven feet.

The index lever 14 is adjusted to be associated with the numerical designation of a focal distance and in being so adjusted the scale plate 15 is moved to a corresponding position at which the numerical designations of the predetermined or arbitrary limits of the depth of field to which the selected focal distance is individual will be presented to view through the openings 17 formed in the scale plate 10. The numerical designations of the limits of each depth of field are spaced apart equally to the spacing between the openings 17 so that only the limits of the depth of field which correspond to the focal depth to which the lever 14 is adjusted will appear at the opening 17, the remaining numerical designations upon the scale plate 15 being concealed where they underlie the plate 10, though I do not wish to be limited to a structure in which the plate 10 is opaque nor do I wish to be limited to an arrangement in which the two scale plates are in the intimate association illustrated, nor do I wish to be limited, in all embodiments of the invention, to the measurements of the focal distances placed in association with the different positions of the adjusting lever 14.

The instrument which I have thus far specifically described is desirably mounted upon the camera, as set forth. When it is mounted upon the camera I also desirably enable such instrument to perform the additional function of positioning the camera front so that the lens is placed in proper focal distance when the adjusting lever 14 is set to such focal distance. When the invention is thus embodied the camera front is preferably coupled with the lever 14 to which end the base 18 of the camera front carries a dog 19 that is threaded by a plunger rod 20 around which a spring 21 is disposed and which plunger rod is engaged by the finger piece 22 to move the dog 19 outwardly against the force of the spring 21. The nose of the dog is receivable within a correspondingly shaped opening provided in the slotted plate 23, the portion of the plate 23 engaged by the nose of the dog 19 being in the form of a wing 24. Another wing 25 projects upwardly from the rear portion of the plate 23 and engages the rear wall of the base 18. When the base 18 has its rear wall in engagement with the wing 25 and when the dog 19 is in engagement with the wing 24, the lens carrying front of the camera and the lever 14 are coupled since the plate 23 is carried by the reciprocable plate 26 that is mounted to slide in the ways 27, this plate 26 having pin and slot connection with the lever 14 as indicated at 28. In view of the variation of lenses employed in cameras the plate 23 is desirably adjustable longitudinally of the plate 26 and when the plate 23 has been adjusted so that the lens will be at proper focal distance when the lever 14 is set to such distance, the adjustment is made fast by tightening the screws 29.

While I have herein shown and particularly described the preferred embodiment of my invention I do not wish to be limited to the precise details of construction shown as changes may readily be made without departing from the spirit of my invention but having thus described my invention I claim as new and desire to secure by Letters Patent the following:—

1. An instrument for selecting predetermined limits of depths of field including a scale denoting such limits and a cover in moving relation to the scale for differentiating the limits of any selected depth of field from the limits of other depths of field or focus.

2. An instrument for selecting predetermined limits of depths of field including a scale denoting such limits; a cover in moving relation to the scale for differentiating the limits of any selected depth of field from the limits of other depths of field; a second scale denoting focal distances that are individual to various depths of field, and an index for adjustment to the latter scale and operatively connected with the cover to differentiate the limits of the depth of field corresponding to the position of the index from the limits of other depths of field.

3. An instrument for selecting predetermined limits of depths of field including a scale denoting such limits; a cover in moving relation to the scale for differentiating the limits of any selected depth of field from the limits of other depths of field or focus; and a lens carrier operatively coupled with the cover to adjust the lens to correspond with a selected depth of field.

4. An instrument for selecting predetermined limits of depths of field including a scale denoting such limits; a cover in moving relation to the scale for differentiating the limits of any selected depth of field from the limits of other depths of field; a second scale denoting focal distances that are individual to various depths of field, an index for adjustment to the latter scale and operatively connected with the cover to differentiate the limits of the depth of field corresponding to the position of the index from the limits of other depths of field; and a lens carrier operatively coupled with the cover to adjust the lens to correspond with a selected depth of field.

In witness whereof, I hereunto subscribe my name this twenty eighth day of January, A. D. 1916.

HARRY L. IDE.

Witnesses:
G. L. CRAGG,
ETTA L. WHITE.

Copies of this patent may be obtained for five cents each, by addressing the "Commissioner of Patents, Washington, D. C."